United States Patent Office 3,284,602
Patented Nov. 8, 1966

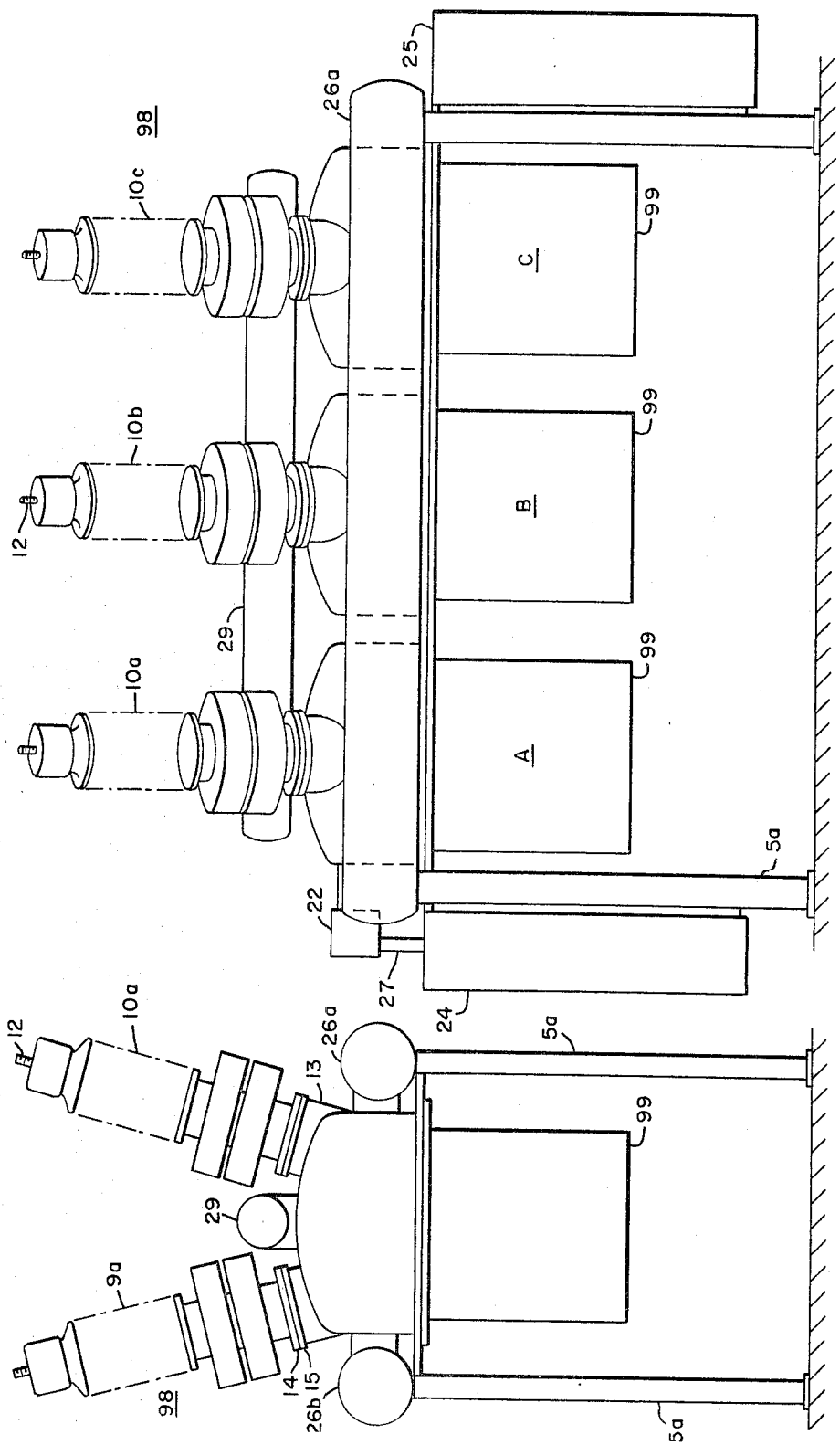

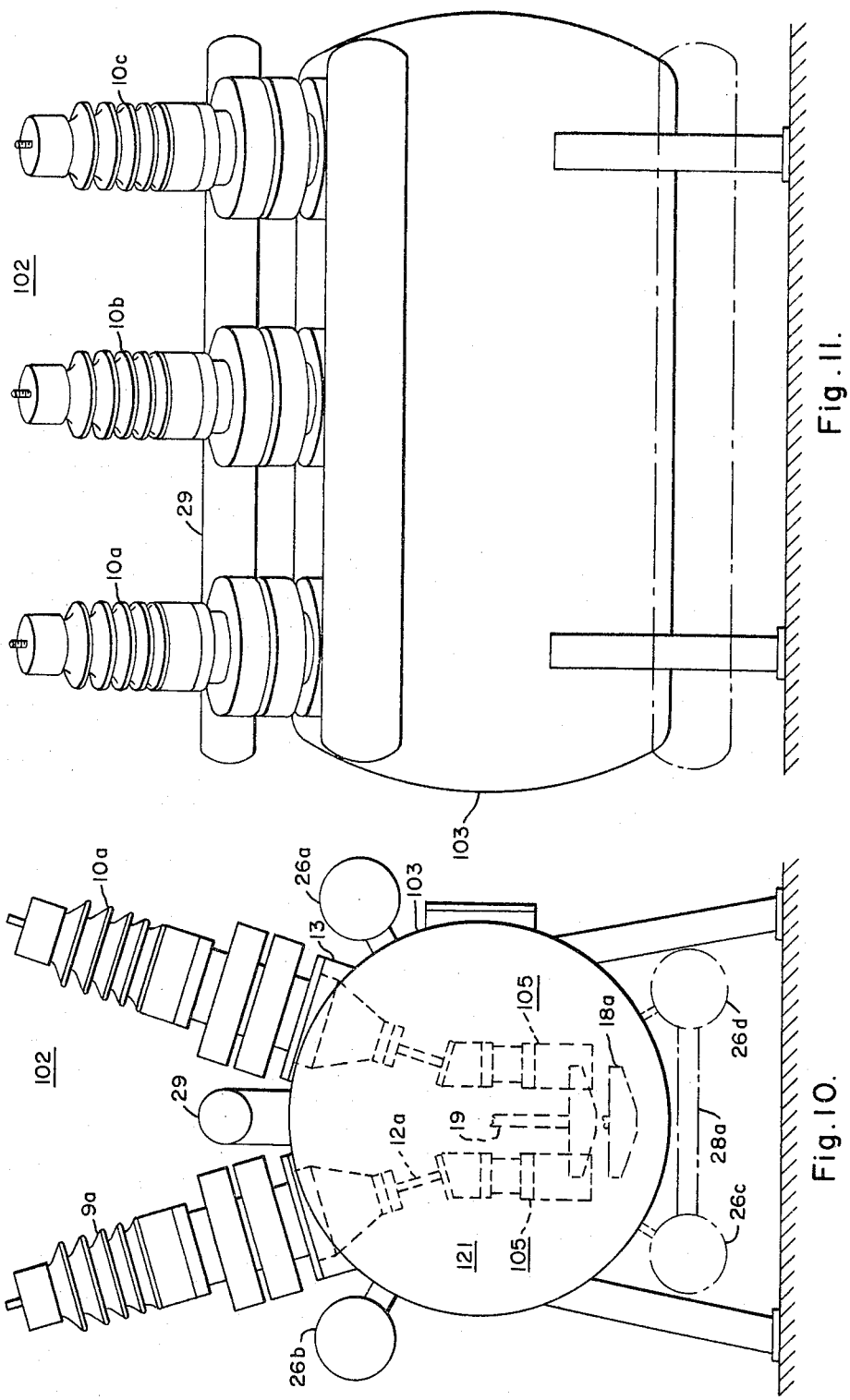

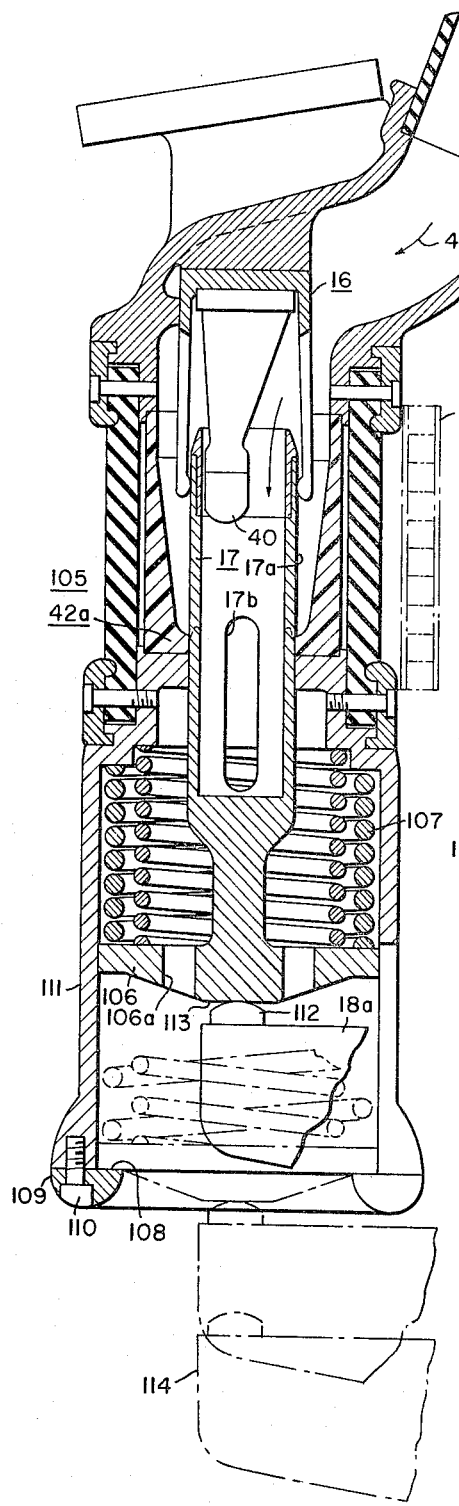
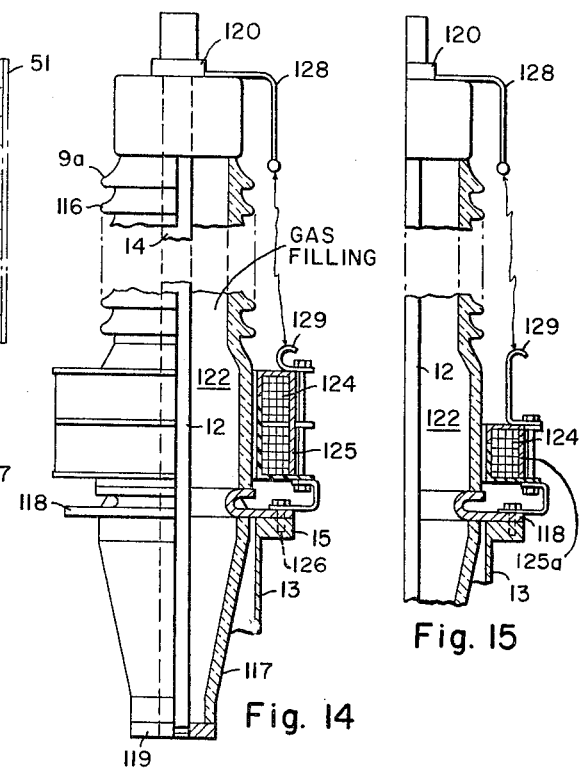
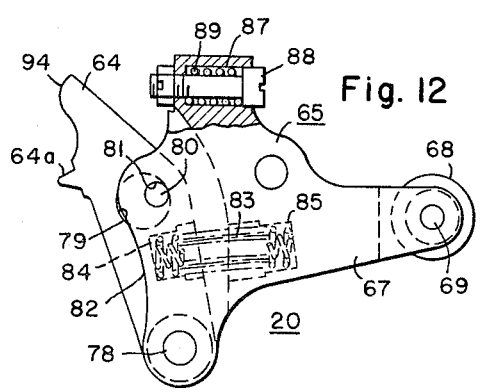

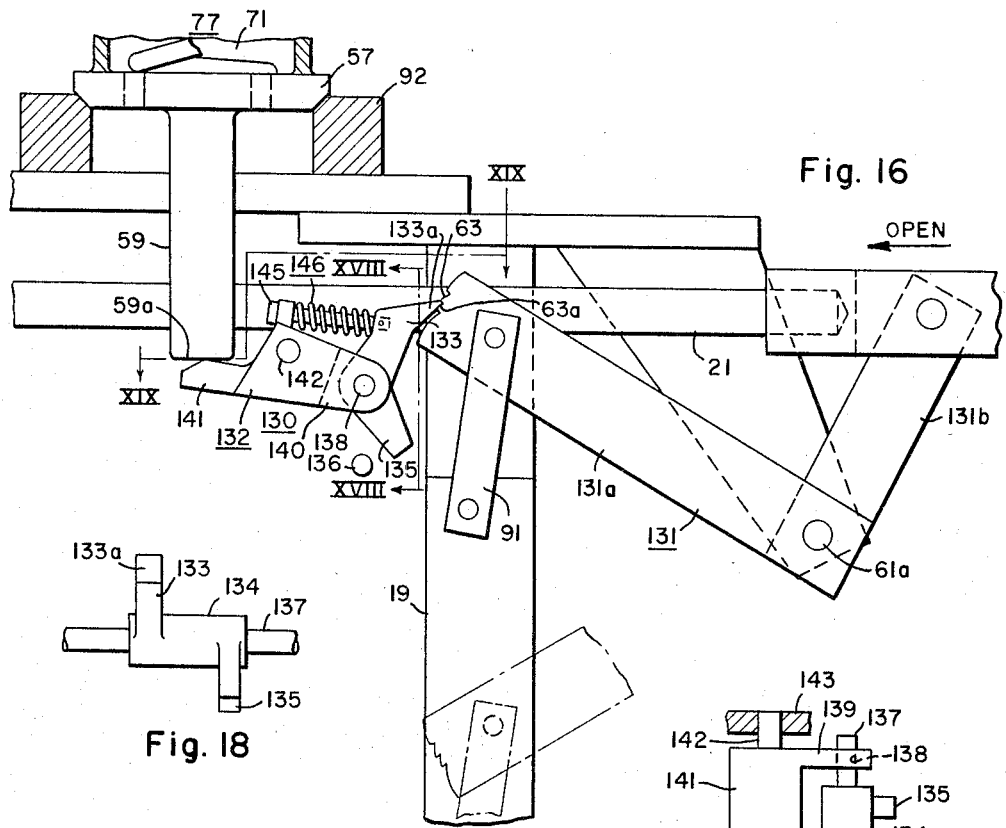
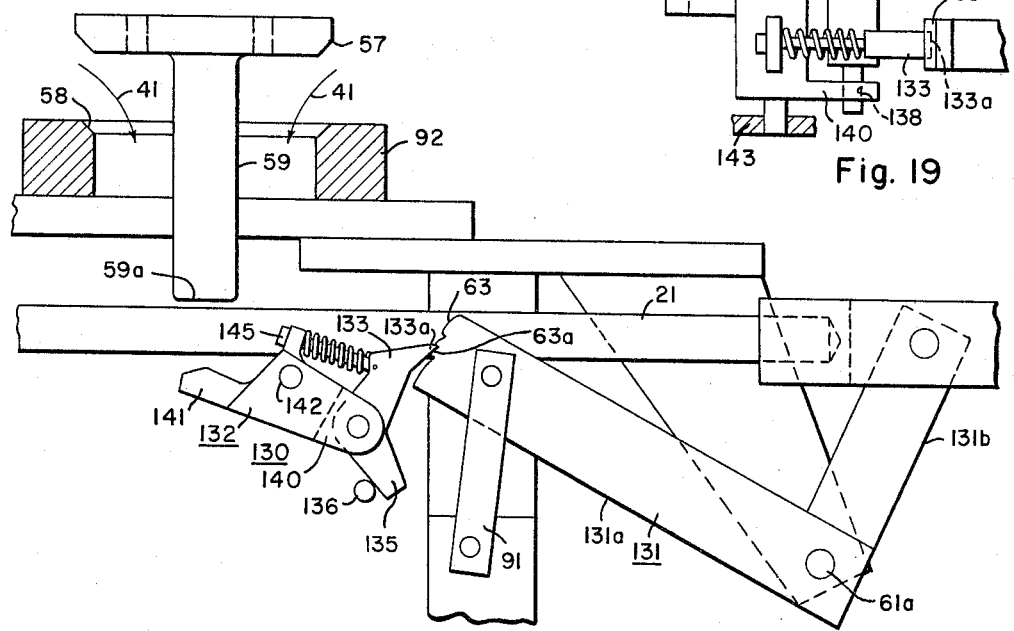

3,284,602
COMPRESSED-GAS CIRCUIT INTERRUPTERS
Robert E. Friedrich, Upper Saint Clair Township, Allegheny County, Robert G. Colclaser, Jr., Franklin Township, Westmoreland County, and Henrik Greger, Swissvale, Pa., assignors to Westinghouse Electric Corporation, East Pittsburgh, Pa., a corporation of Pennsylvania
Filed Dec. 20, 1961, Ser. No. 160,957
10 Claims. (Cl. 200—148)

This invention relates to compressed-gas circuit interrupters in general and, more particularly, to an improved compressed-gas circuit interrupter of the type utilizing a grounded metallic tank as the enclosing structure, having terminal bushings extending thereinto and generally being of similar appearance to that of conventional oil-tank circuit interrupters.

A general object of the present invention is to provide an improved highly-efficient compressed-gas circuit interrupter suitable over a wide current and voltage range, and adapted for a complete line of circuit interrupters extending, for example, over a voltage range of 46 kv. to 138 kv., and higher.

A more specific object of the present invention is the provision of an improved compressed-gas circuit interrupter utilizing a pair of spaced compressed-gas interrupting units electrically bridged by a vertically-movable conducting cross-bar, and having associated therewith an improved blast-valve assembly for simultaneously causing a blast of gas into the two compressed-gas units disposed in serial relation.

A more specific object of the present invention is the provision of an improved compressed-gas circuit interrupter, in which, by a suitable disposition of the component parts thereof, the blast-valve mechanism is close to ground potential, and may be readily serviced, whereas the compressed-gas arc-extinguishing units, at high potential, are connected by an insulating conduit means to the aforesaid blast-valve assembly.

A further object of the present invention is the provision of an improved compressed-gas circuit interrupter having an improved linkage to correlate the opening movement of the lift rod and cross-bar structure with opening of the blast valve for timing the passage of the gas blast toward the serially-related bridged arc-extinguishing units.

Still a further object of the present invention is the provision of an improved compact three-phase compressed-gas circuit interrupter, in which the several pole-units are disposed within a single tank structure to minimize space and to result in a light-weight construction.

Another object of the present invention is the provision of an improved compressed-gas arc-extinguishing unit, which more effectively directs the gas blast and, for certain applications, has readily associated therewith a shunting impedance device suitable for lowering the rate of rise of the recovery voltage and/or insuring equal voltage division between the several units.

Still a further object of the present invention is an improved terminal bushing construction utilizing a current transformer and having minimum axial dimensions.

A more specific object of the present invention is the provision of an improved and highly-efficient blast-valve linkage.

Yet a further object of the present invention is the provision of an improved compressed-gas circuit-interrupting structure suitable for disposition within spaced metallic grounded tanks for the higher high-voltage ratings.

In United States patent application filed August 17, 1960, Ser. No. 50,183, now abandoned, by Frank L. Reese and Robert G. Colclaser, Jr., and assigned to the assignee of the instant application, there is disclosed and claimed an improved compressed-gas circuit interrupter utilizing a dual-pressure system, in which the arc-extinguishing gas, for example, sulfur-hexafluoride ($SF_6$) gas, is not only used for arc-extinguishing purposes but also for contact-operating movement. In the aforesaid patent application, there is provided a high-pressure tank having conduit means interconnecting with the pole-units and employing a plurality of blast valves, one individually to each pole-unit, for insuring a blast of arc-extinguishing gas into the arc-extinguishing structures. It is a further object of the present invention to improve upon the circuit-interrupting arrangement of the aforesaid patent application rendering it more compact in construction, and improving the efficiency of the individual arc-extinguishing units.

In United States patent application, filed February 15, 1961, Serial No. 89,496, now U.S. Patent 3,258,569, issued June 28, 1966 to Russell E. Frink, and assigned to the assignee of the instant application, there is disclosed and claimed a single-break grounded-tank compressed-gas circuit interrupter adapted for cubicle application, and utilizing a dual-pressure system. It is a further object of the present invention to improve upon the circuit-interrupting arrangement of the aforesaid Frink application rendering it suitable for high-voltage application and adaptable over a wide current and voltage range.

There are many advantages to be obtained by the utilization of a highly-efficient arc-extinguishing gas, such as sulfur hexafluoride ($SF_6$) gas, for the interrupting medium. In addition to the remarkable arc-extinguishing characteristics of the gas, the high dielectric strength thereof renders the employment of relatively small tank structures feasible. In addition, because of the exceptional dielectric strength of the gas, internal clearances may be small, and, more importantly, no shock is transmitted to the circuit-interrupter foundation by the gas during fault interruptions.

It is an additional object of the present invention to take full advantage of the aforesaid characteristics of this remarkable gas to provide a light-weight, compact and highly-efficient high-voltage circuit interrupter, adaptable for ready maintenance, when required, and suitable for a wide current and voltage range.

Further objects and advantages will readily become apparent upon reading the following specification, taken in conjunction with the drawings, in which:

FIG. 7 is a fragmentary vertical sectional view taken substantially along the line VII—VII of FIG. 5;

FIG. 8 illustrates an end elevational view of a modified-type circuit interrupter utilizing individual tanks for the pole-units;

FIG. 9 is a side elevational view of the modified-type circuit interrupter construction of FIG. 8;

FIG. 10 is an end elevational view of a further modified-type of circuit-interrupting construction;

FIG. 11 is a side elevational view of the modified-type circuit-interrupting construction of FIG. 10;

FIG. 12 is a detailed view of the blast-valve latch assembly of FIGS. 5 and 6;

FIG. 13 illustrates an enlarged vertical sectional view taken through the modified-type compressed-gas arc-extinguishing unit utilized in the modified circuit-interrupting arrangement of FIGS. 10 and 11;

FIG. 14 is a partial vertical sectional view, with the remainder of the view being in side elevation, of the improved gas-filled terminal bushing employed in the circuit-interrupter constructions of FIGS. 1 and 2;

FIG. 15 is a fragmentary view, somewhat similar to that of FIG. 14, but utilizing only a single current transformer;

FIG. 16 illustrates a modified-type blast-valve assembly, which may be used in place of the blast-valve assembly of FIGS. 5, 6 and 12;

FIG. 17 is a view similar to that of FIG. 16, but showing the disposition of the several parts at an intermediate point in the opening operation, with the blast valve open, and the operating linkage corresponding to a position in which the contact structure has separated;

FIG. 18 is a fragmentary detailed view taken substantially along the line XVIII—XVIII of FIG. 16; and, FIG. 19 is a fragmentary plan view taken substantially along the line XIX—XIX of FIG. 16.

Figure 1:
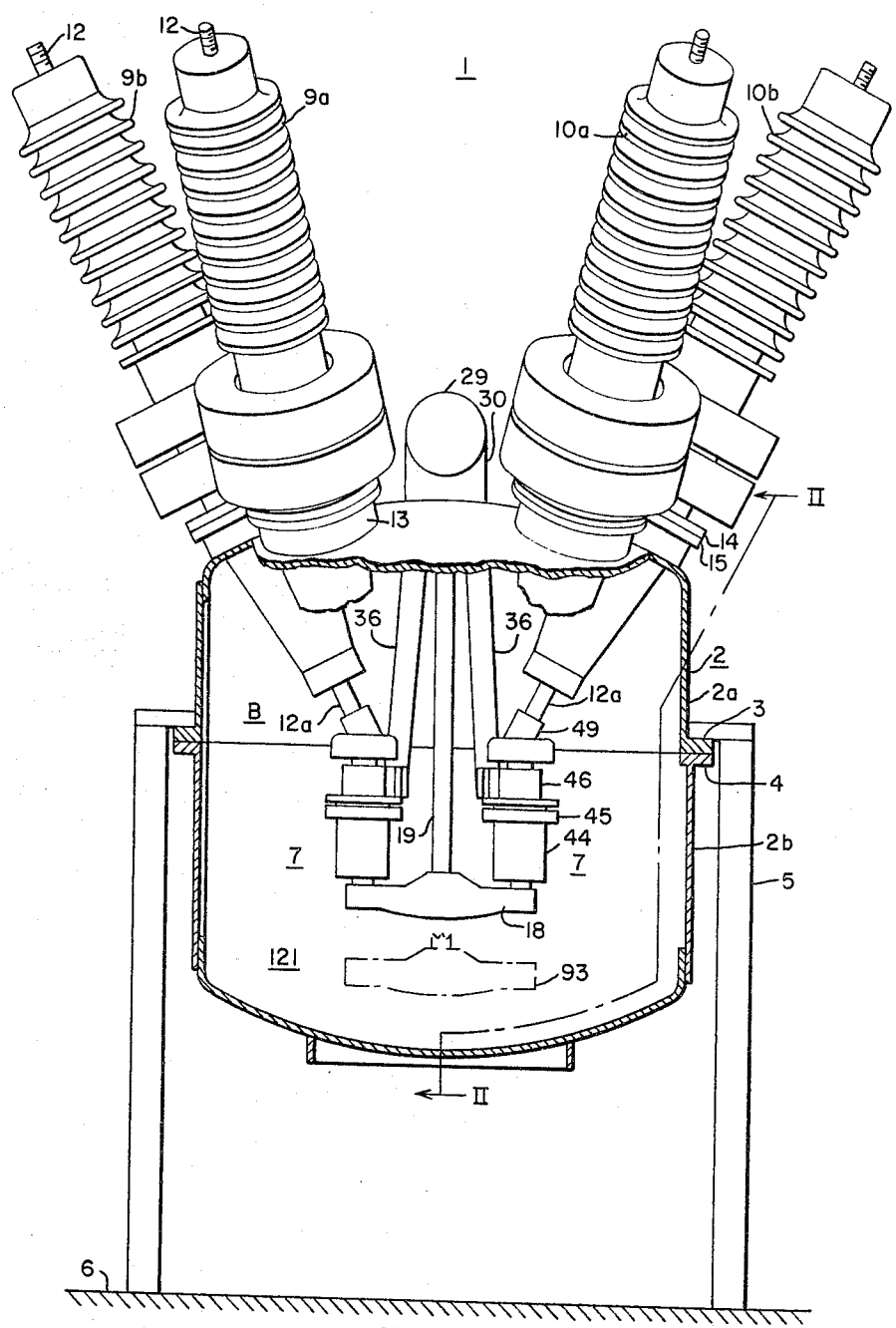
FIG. 1 is a generally vertical sectional view taken substantially along the line I—I of FIG. 2 illustrating an embodiment of the present invention, the contact structures being illustrated in the closed-circuit position.

Referring to the drawings, and more particularly to FIG. 1 thereof, the reference numeral 1 generally designates a high-voltage compressed-gas circuit interrupter. Generally, the circuit interrupter 1 includes three pole-units A, B, C (FIG. 2) disposed within a single grounded tank structure 2. With reference to FIG. 1, it will be noted that the tank 2 is of a split construction, comprising an upper tank half 2a and a lower tank half 2b secured together, as by bolts, not shown, at the peripheral flange portions 3, 4. An upstanding angle-iron frame 5 may be employed to support the tank 2 an adequate distance above the ground level 6 with clearance space so that the lower tank half 2b may be lowered to enable a visual inspection of the serially-related interiorly-disposed compressed-gas arc-extinguishing units 7.

It will be noted that each pole-unit A, B and C comprises a pair of units 7 secured fixedly into operative position at the interior ends of an associated pair of terminal bushings 9a, 10a, 9b, 10b, 9c and 10c. The several terminal bushings 9a, 9b, 9c, 10a, 10b, 10c are fixedly secured by upstanding cylindrical supports 13 (FIG. 2) and mounting flange rings 14, 15 as well known by those skilled in the art.

With reference to FIG. 14, it will be noted that each terminal bushing 9a, 10a, etc. has a tubular terminal stud 12 extending axially therethrough and conducting current to the separable contact structures 16, 17 associated with each arc-extinguishing unit 7. As more clearly illustrated in FIG. 1, the serially-related arc-extinguishing units 7 are electrically bridged, and operated by a conducting cross-arm 18 which is reciprocally operated in a vertical direction by an insulating lift-rod 19. The vertically-movable insulating lift-rod 19 is interconnected, through an operating linkage 20 (FIG. 5), with a horizontally-disposed pull rod 21 extending into a bell-crank lever box 22 (FIG. 2), within which, through a sealed connection, an operating rod, not shown, extends downwardly through an enclosing pipe 27 and interiorly of a mechanism compartment, designated by the reference numeral 24. The operating mechanism disposed within the mechanism compartment 24 constitutes no part of the present invention, and may be of any conventional type. Reference may be had to United States Patent 2,656,430 issued October 20, 1953 to Roswell C. Van Sickle for a description of a suitable operating mechanism adaptable for operation within the mechanism housing 24.

Figure 2:
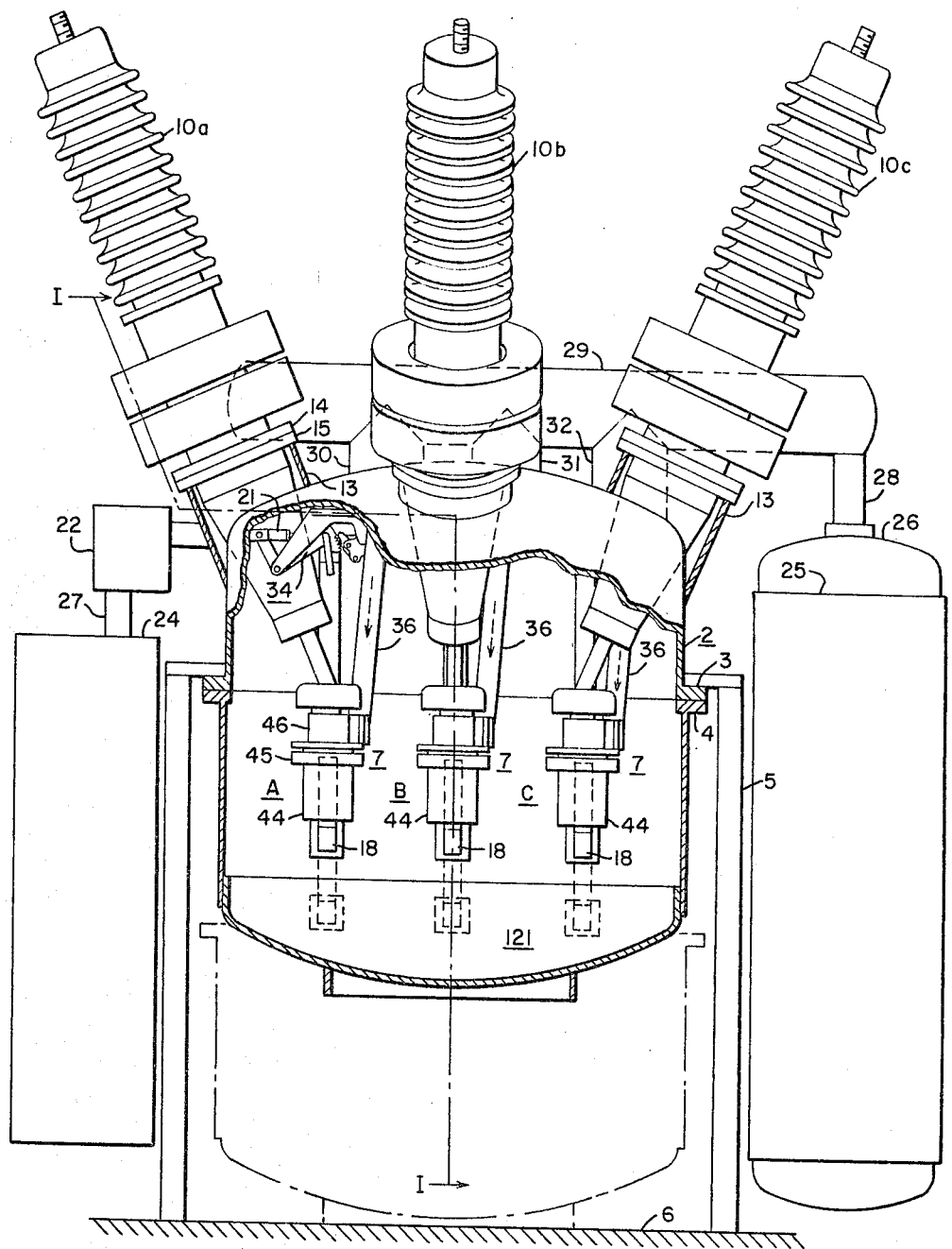
FIG. 2 is a generally vertical sectional view taken substantially along the line II—II of FIG. 1, illustrating a three-pole construction, and again the contact structures being illustrated in the closed-circuit position.

With reference to FIG. 2, it will be observed that disposed on the opposite side of the tank structure 2 from the mechanism compartment 24 is a gas-control compartment 25 and a high-pressure reservoir tank 26. Suitable pressure switches and a suitable compressor unit, not shown, may be disposed interiorly within the gas-control compartment 25, which function to maintain the gas pressure within the high-pressure tank 26 at the desired pressure level. Reference may be had to United States patent application, filed January 23, 1959, Serial No. 788,668, now United States Patent 3,057,983, issued October 9, 1962 to Russell N. Yeckley, Joseph Sucha and Benjamin P. Baker, and assigned to the assignee of the instant application, for a description of suitable pressure-control equipment.

Extending upwardly from the high-pressure reservoir tank 26, which contains a suitable highly-efficient gas, such as sulfur hexafluoride ($SF_6$) gas, is a conduit 28, which interconnects with an upper horizontally-disposed high-pressure storage tank 29.

Figure 5:
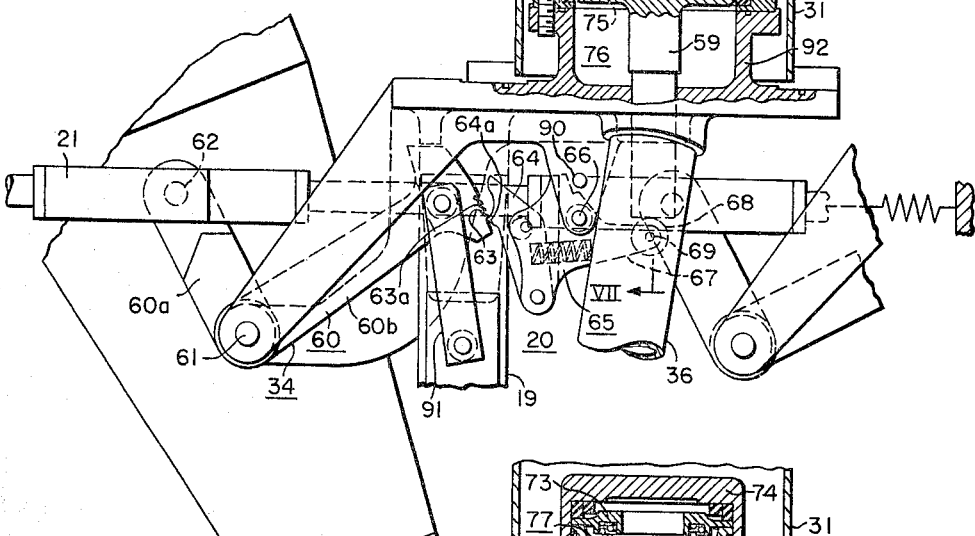
FIG. 5 is an enlarged fragmentary view of the blast-valve assembly for the improved circuit interrupter of the present invention, the blast valve and contact linkage being illustrated in the closed-circuit position.
Figure 6:
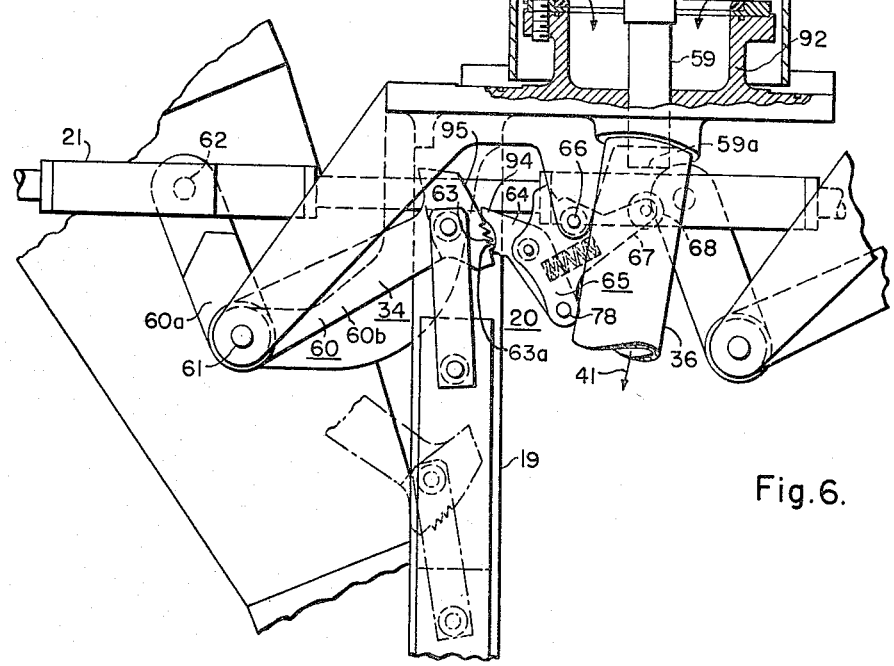
FIG. 6 is a view similar to that of FIG. 5, but illustrating the disposition of the several parts at an intermediate point in the opening operation, wherein the blast valve is opened, and the contact linkage is shown in a position corresponding to a separated contact position.

Extending downwardly from the horizontally-disposed high-pressure reservoir tank 29 are three branch blast-pipes 30, 31 and 32 (FIG. 2), having associated therewith, at the lower ends thereof, three blast-valve assemblies 34 of a type more clearly illustrated in FIGS. 5, 6 and 12 of the drawings.

Figures 4, 4A:
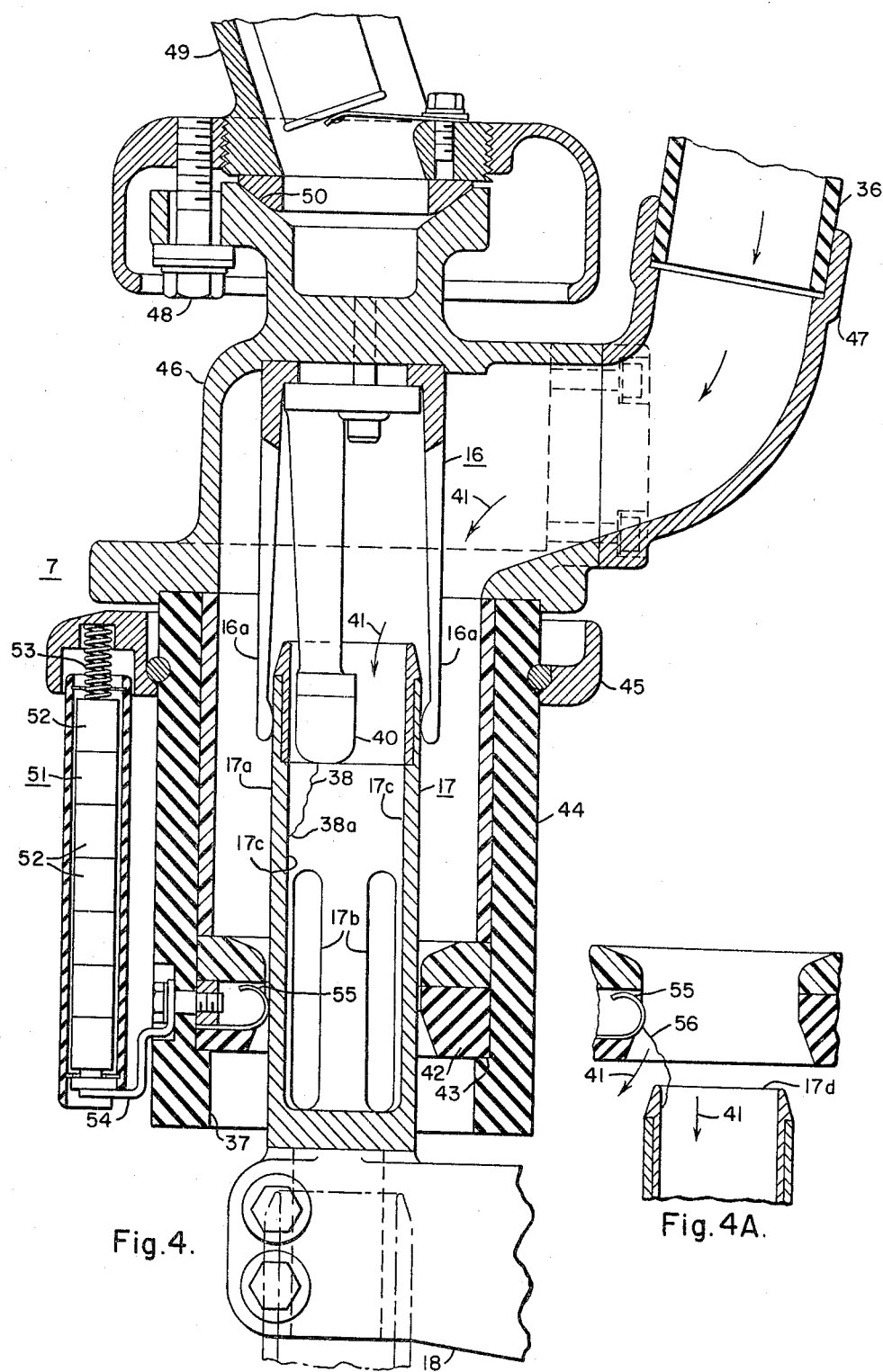
FIG. 4 is an enlarged vertical sectional view taken through one of the compressed-gas arc-extinguishing units, substantially along the line IV—IV of FIG. 3, and the contact structure being illustrated in the closed-circuit position.
FIG. 4A is a fragmentary view similar to that of FIG. 4, but illustrating the drawing of the residual current arc.

Generally, the operating linkage 20 is such as to simultaneously effect blast-valve opening movement with contact-separating movement, so that the separated contacts 16, 17, within each unit 7, draws an arc 38, which is quickly extinguished by a blast of high-pressure gas passing downwardly through an insulating blast tube 36 associated with each arc-extinguishing unit 7. Reference may be had to FIGS. 4 and 7 in this connection.

With particular attention being directed to FIG. 4 of the drawings, it will be noted that the relatively stationary contact structure 16 comprises a plurality of circumferentially-disposed flexible contact-fingers 16a which make contacting angagement on the external side 17a of the tabular movable contacts 17. Venting slots 17b are preferably associated with each movable contact 17, so that a blast of gas may pass through the movable vented contact 17 carrying the arc 38 along the inner wall 17c thereof, as indicated in FIG. 4. Although FIG. 4 shows the breaker-closed position, nevertheless for purposes of illustration the main current arc 38 has been drawn into the figure.

Reference may be had to United States patent application filed October 7, 1960, Serial No. 61,284, now U.S. Patent 3,154,658, issued October 27, 1964 to Robert G. Colclaser, Jr., and Russell N. Yeckley, and assigned to the assignee of the instant application, for a detailed description of the arc-extinguishing action, which occurs within the arc-extinguishing unit 7. Briefly, such arc-extinguishing action includes an initial separation of the movable contact 17 from the contact fingers 16a and a subsequent transfer of the current to the stationary arc horn 40, from which the arc 38 terminates, as diagrammatically indicated in FIG. 4 of the drawings. The downward flowing blast of gas, as indicated by the arrows 41 in FIG. 4, carries the lower terminal 38a of the arc 38 downwardly along the inner wall 17c of the movable contact 17, lengthening it toward a current zero, and effecting rapid extinction thereof. The gas blast exhausts through the venting slots 17b and through the open lower end 37 of the unit 7.

It will be observed that an insulating orifice structure 42 is provided, being seated upon a shoulder portion 43 of the insulating casing 44 of the extinguishing unit 7. Also, a mounting flange-ring 45 is bolted to an upper cover casting 46 having a blast-pipe extension 47, into which the insulating blast tube 36 extends.

The upper casting 46 is secured, by a plurality of mounting bolts 48, to a support-casting 49, which, in turn, is threadedly secured to the lower end 12a of the terminal stud 12 extending axially through the terminal bushing. It will be noted that there is provided an adjustable foot 50 (FIG. 4), in connection with the upper casting 46, which permits a limited pivoting action to take place for proper alignment of the arc-extinguishing unit 7 relative to the movable contacts 17 and cross-bar 18.

For purposes of voltage division between the two serially-related arc-extinguishing units 7, there is provided a relatively high-value ohmic impedance means, generally designated by the reference numeral 51, and comprising a plurality of aligned abutting capacitor or resistor blocks 52. The upper end of the upper impedance block 52 is electrically connected, by a spring 53' to the support flange ring 45 and hence to the upper casting 46 and stationary contact 16. The lower end of the impedance means 51 is electrically connected, by a conducting strap 54, to a flexible contact finger tap 55, which bears externally upon the outer side 17a of the movable tubular contact 17. As a result, the arc 38 is rapidly extinguished, and the rate of rise of the recovery voltage may be influenced if the impedance means 51 is of a desired relatively low value. Even for a relatively high value of impedance means 51, the advantage of equal voltage division between the units 7 is obtained, thereby facilitating interruption. Final interruption of the residual current arc 56 (FIG. 4A) takes place at the contact tap 55, the residual current arc 56 extending between this tap 55 and the upper extremity 17d of the movable tubular contact 17 in a manner well known by those skilled in the art.

Figure 3:
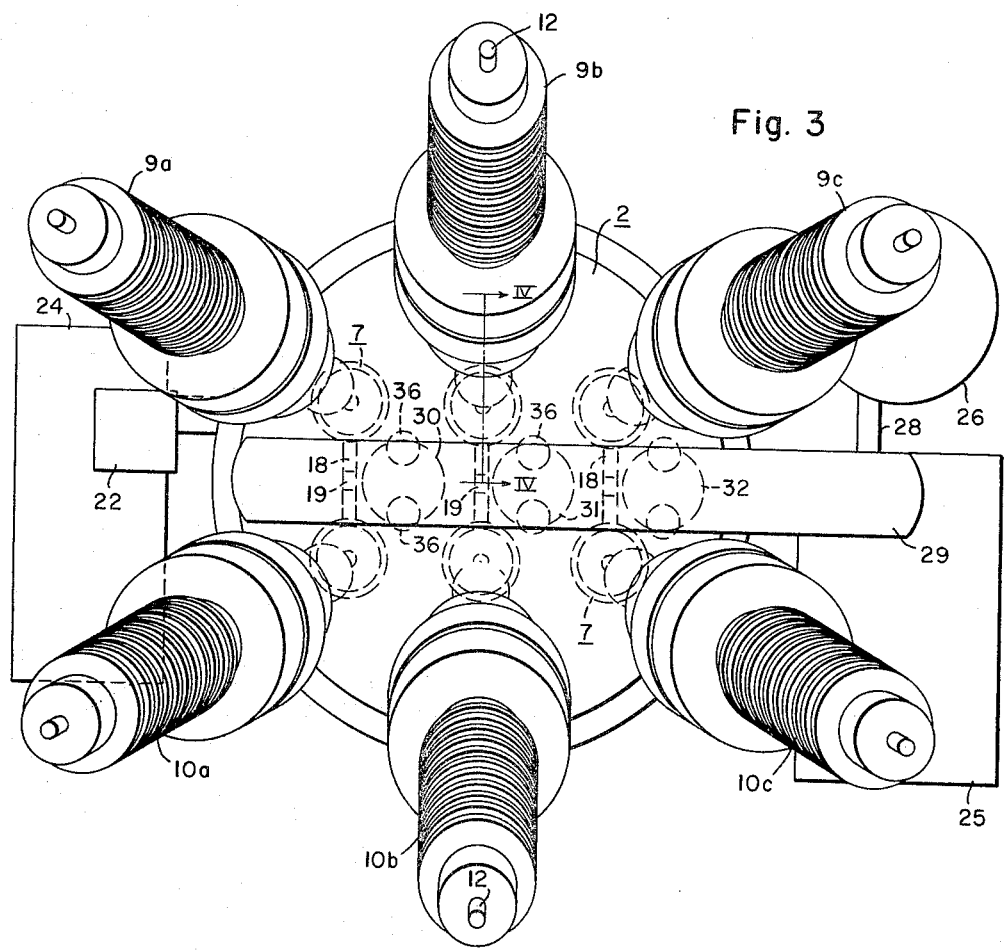
FIG. 3 is a top plan view of the circuit interrupting structure of FIGS. 1 and 2.

The blast valve and operating linkage 20 will now be described. As previously mentioned, there are three downwardly extending blast-tubes 30, 31, 32 (FIG. 3) associated with the upper horizontally-disposed high-pressure reservoir tank 29. One such blast-tube 31 is illustrated in FIG. 7 of the drawings. Controlling the flow of high-pressure gas downwardly through the blast tube 31 is a blast valve 57, seated upon a valve seat 58, which may be of a suitable flexible material, such as rubber, and having a blast-valve stem 59 associated therewith. As more fully brought out hereinafter, the rightward opening movement of the horizontally-extending pull-rod 21, as viewed in FIGS. 5 and 6, effects clockwise rotation of a bell-crank lever 60 having arm portions 60a and 60b and pivotally mounted upon a fixed pivot pin 61. As shown in FIG. 5, the bell-crank lever arm 60a is pivotally connected, as by a pivot pin 62, to the horizontally-extending pull-rod 21. The outer free end of the arm 60b has a ratchet surface 63, which makes ratching engagement with a ratchet pawl 64 associated with a latch assembly 65 pivotally mounted about a fixed pivot pin 66. As shown, the latch assembly 65 has a blast-valve operating arm portion 67. The outer free end of the blast-valve operating portion 67 is bifurcated and supports a blast-valve roller 68 between the furcations upon a pivot pin 69.

As shown in FIGS. 5 and 6, the blast-valve roller 68 makes abutting engagement with the lower end 59a of the blast-valve stem 59, and causes upward opening movement thereof, at times, to effect passage of high-pressure gas past the valve seat 58 in a manner illustrated by the arrows 70 in FIG. 6 of the drawings.

Preferably, the blast valve 57 is biased toward a seating position by a compression spring 71 bearing upon the upper side 72 of the blast valve 57. The upper end of the biasing spring 71 seats against a ring-shaped spring seat 73 fixedly supported adjacent the upper end of a valve cylinder 74.

The blast valve 57 has a plurality of circumferentially disposed venting apertures 75 provided therein to enable high-pressure gas within the region 76 to leak through the venting apertures 75 and into the space 77 on the rear side of the blast valve 57. In effect, the blast valve 57 constitutes a piston assembly, which is acted upon slight opening of the blast valve 57, by the pressure of the high-pressure gas within the region 76 to move quickly upwardly by this gas pressure independently of mechanical actuation of the valve stem 59 by the blast-valve roller 68.

From the foregoing description, it will be apparent that initial upward "cracking" of the blast valve 57, by operation of the blast-valve roller 68 upon the stem portion 59, will effect high-pressure gas conditions within the region 76. This high-pressure gas, within the region 76, will take over, in effect, and effect upward full opening travel of the blast valve 57 to its upper limit of travel, as shown in FIG. 6 of the drawings.

It will, however, be noted that while high-pressure gas is flowing downwardly through the blast tube 31, as indicated by the arrows 70 in FIG. 6, this high-pressure gas will at the same time leak through the venting apertures 75 and will raise the pressure within the region 77 on the rear face of the blast valve 57. This rise of pressure within the region 77, as effected by the aforesaid leakage, supplemented by the biasing action exerted by the compression spring 71, ultimately effects downward closing movement of the blast valve 57 upon its valve seat 58. As a result, blast-valve opening is mechanically initiated, and blast-valve closing is determined by the pressure condition existing within the region 77 on the rear face of the blast valve piston 57.

With reference to FIG. 12 of the drawings, which more clearly illustrates the latch assembly 65, it will be noted that the blast-valve latch 65 includes the pawl 64, previously mentioned, which is mounted upon a floating pivot pin 78. The pawl 64, in addition, has a clearance aperture 79 provided therein, through which extends a limit pin 80 extending through apertures 81 provided in furcated portions 82 integrally formed with the blast-valve operating lever 65. Preferably, a biasing spring 83 is provided, seated within apertures 84 and 85 respectively provided within the pawl 64 and within the main body portion of the blast valve lever 65. The function of the biasing spring 83 is to bias the pawl 64 into ratching engagement with the ratchet surface 63 provided on the arm 60b of the bell-crank operating lever 60.

With reference to FIG. 12, it will be noted that the blast-valve operating lever 65 has provided therein a recess portion 87, within which is disposed a cushioning stop bolt 88, biased toward the right, as viewed in FIG. 12, by a cushioning compression spring 89. During clockwise rotation of the blast-valve operating lever 65, the cushioning bolt 88 makes a cushioned stop with a stop 90, and thereby cushions the clockwise limit of travel of the blast-valve lever 65.

FIG. 5 illustrates the disposition of the several parts in the breaker-closed position. At this time the blast valve 57 is likewise closed. With reference to FIG. 6, it will be observed that rightward opening movement of the pull rod 21 effects clockwise opening rotative movement of the bell-crank operating lever 60, and consequently downward opening separating movement of the contacts 16, 17. This is effected by floating link 91 interconnecting lift rod 19 and arm 60b. Also the clockwise rotative movement of the bell-crank operating lever 60 causes, through the ratchet surface 63, counterclockwise rotative movement of the blast-valve latch assembly 65, effecting thereby corresponding upward opening movement of the blast-valve roller 68. Since the blast-valve roller 68 abuts the lower end 59a of the blast-valve stem 59, the blast valve 57 will be opened to a slight extent or cracked. As previously described, the pressure conditions within the region 76 then quickly pneumatically effect upward full opening movement of the blast valve 57, which functions as a piston during this period within the valve cylinder 74.

High-pressure gas at a pressure, for example, of 220 p.s.i.g. flows downwardly through the blast tube 31 and past the valve seat 58 into a blast-valve manifold casting 92 (FIG. 7) to flow through two insulating blast tubes 36 and toward the serially-related arc-extinguishing units 7 associated with each pole-unit A, B or C.

Extinction of the arcs 38 and 56 occurs in the previously described manner, and continued downward opening movement of the lift rod 19 and conducting cross-bar 18 effects two isolating gaps into the circuit, as indicated by the dotted lines 93 of FIG. 1 of the drawings.

The ratchet surface 63 carries the nose 64a of the pawl 64 downwardly therewith until a cam portion 94 inter-engaging a cam portion 95 effects disengagement of the nose 64a of pawl 64 from the particular ratchet tooth 63a then being engaged.

Such action will free the blast-valve latch assembly 65 from engagement with the arm 60b of bell-crank lever 60, and thereby permit the blast valve 57 to freely close dependent upon the pressure conditions existing within the space 77 on the rear side of the blast valve 57, as previously described.

The dimensions of the several parts, and the characteristics of the compression spring 71 are designed to insure an opening of the blast valve 57 for the proper length of time for effective arc-extinguishing action without permitting an unnecessary waste of high-pressure gas. The interrupting time of the compressed-gas circuit interrupter 1 under consideration is only five cycles. It will, therefore, be apparent that the blast valve 57 is open for only a short period of time.

FIGS. 8 and 9 collectively illustrate a modified-type circuit interrupter, generally designated by the reference numeral 98. It will be observed that instead of using a high-pressure reservoir tank 26, as shown in FIG. 2, instead a longitudinally-extending pair of high-pressure reservoir tanks 26a, 26b are supported by a frame structure 5a. In addition, a horizontally-extending high-pressure reservoir tank 29 extends between the bushings 9a, 9b, 9c and the companion terminal bushings 10a, 10b and 10c. Passage means pneumatically interconnects the high-pressure reservoir tanks 26a, 26b and 29 in a manner similar to that previously described in connection with FIG. 2 of the drawings.

The modified-type circuit interrupter 98 of FIGS. 8 and 9 provides a separate tank structure 99 for each pole-unit A, B, or C. There is also provided a bell-crank operating lever housing 22, enclosing pipe 27, for enclosing an operating rod, not shown, which extends downwardly within a mechanism compartment 24. As shown in FIG. 9, a gas-control compartment 25 may additionally be provided. The multiple-tank arrangement of the modified-type circuit interrupter 98 is particularly suitable for the higher voltage ratings.

FIGS. 10 and 11 collectively illustrate a modified-type of circuit interrupter, generally designated by the reference numeral 102. In some respects, the terminal-bushing disposition of this interrupter is similar to that of the multiple-tank arrangement of FIGS. 8 and 9. However, it will be noted that a single elongated tank structure 103 is provided, which encloses the several pole-units A, B and C. The high-pressure reservoir tanks 26a, 26b may be located in the position shown, and, in substitution thereof, or in addition thereto, additional high-pressure reservoir tanks 26c, 26d may be provided. Interconnecting passage means 28a may be employed, as illustrated in FIG. 10.

It will be apparent that the modified-type circuit-interrupting structure 102 of FIGS. 10 and 11 is particularly adapted for the higher voltage and current ratings.

The arc-extinguishing units 105, employed in the construction pictured in FIG. 10, may be of the type illustrated in more detail in FIG. 13 of the drawings. With reference to FIG. 13, it will be noted that the movable tubular contact 17 has integrally cast therewith a lower spring seat 106 having venting apertures 106a associated therewith. An accelerating spring 107 is provided, biasing the spring seat 106, and consequently the movable tubular contact 17, toward a downward opening position. A shoulder portion 108, provided by a stop ring 109, bolted, by bolts 110, to a lower casting 111, limits the downward opening travel of the spring seat 106, and consequently determines the open-gap separation distance between the contacts 16, 17.

The operation of the modified-type arc-extinguishing unit 105 is similar to that previously described in connection with FIG. 4 of the drawings. It will be noted, however, in this particular embodiment that the shunting impedance means 51 is connected to the lower casting 111, and contact is made with the moving contact 17 through the spring 107. The residual current is interrupted when the contact tip 112 moves away from the spring seat 113. Again, an orifice structure 42a is provided to assist in guiding the downward opening movement of the movable tubular contact 17. In addition, it will be noted that additional guiding action is obtained by the interengagement between the lower spring seat 106 and the lower guide cylinder 111.

The conducting cross-bar 18a preferably has a contact tip 112, which makes abutting engagement with the lower extremity 113 of the spring seat 106. During the opening operation, following halting of the spring seat 106 by the shoulder portion 108 of stop ring 109, the bridging cross-bar 18a will continue its downward movement inserting thereby two isolating gaps into the circuit, as indicated by the dotted lines 114 in FIG. 13 of the drawings.

FIGS. 14 and 15 collectively illustrate in detail the constructional features of the terminal bushings utilized in practicing the present invention. It will be obvious, of course, that different terminal bushings may be employed in conjunction with the arc-extinguishing units 7, 105, without interfering with the operation of the breaker. For example, an oil-filled terminal bushing could well be employed. However, it is of considerable convenience to employ a gas-filled terminal bushing, in which the gas filling is obtained directly from the tank structure 2 of the circuit interrupter 1, 98, or 102.

With reference to FIG. 14, it will be observed that there is provided a pair of hollow insulating shells 116, 117 formed of a suitable insulating material having weather-proof characteristics. One such suitable material, for example, may be porcelain. The porcelain shells 116, 117 seat, by way of gasket means, not shown, against an intermediately-disposed flange mounting ring 118 and threaded end rings 119, 120. Preferably, the end rings 119, 120 thread upon threaded portions of the axially-disposed conductor stud 12. The tubular conductor stud 12 may have a venting aperture provided in the tubular side wall thereof permitting communication between the gas space 121, interiorly of the tank structure 2, and the region 122 interiorly of the bushing shells 116, 117. As a result, the gas filling for the terminal bushing is directly provided from the tank structure 2.

It will be noted that in the construction of FIG. 14 there is provided a pair of current transformers 124 having a grounded outer metallic casing 125, which, during flashover, provides differential protective relaying functions similar to that obtained in tank-type oil circuit interrupters. As shown, the mounting flange 118 is fixedly secured, as by bolts 126, to the flange ring 15 of the neck portion 13 of tank 2. A bushing breakdown gap may be provided between an arcing horn 128 and a gap electrode 129, the spacing between which determining the voltage breakdown.

FIG. 15 illustrates a modified-type of terminal-bushing construction in which only a single current transformer 124 is utilized. Again, a grounded transformer casing 125a is provided insuring thereby the possibility of obtaining differential relaying in a manner well known by those skilled in the art.

FIGS. 16–19 illustrate a modified-type of blast-valve operating linkage, generally designated by the reference numeral 130. The horizontal pull rod 21 and the bell-crank operating lever construction 131 may be similar to that previously described. It will be noted that the bell-crank lever 131 has operating arms 131a, 131b and is pivotally mounted upon a fixed pivot 61a. The insulating link construction 91 causing actuation of the lift rod 19 may be similar to that previously described. The blast-valve latching assembly 132, however, is slightly different than that heretofore described in connection with FIG. 12 of the drawings. With reference to FIGS. 16 and 19 of the drawings, it will be noted that the modified-type blast-valve assembly 132 comprises a pawl 133 integrally formed with a sleeve portion 134 (FIG. 18), the latter, in turn, having integrally formed therewith a stop portion 135. The stop or limiting portion 135 makes abutting engagement with a stop pin 136 during the opening operation of the circuit interrupter, as indicated in FIG. 17 of the drawings.

A pivot pin 137 loosely extends through the sleeve portion 134 and is journaled within apertures 138 provided in the furcations 139, 140 of a pivotally-mounted blast-valve lever 141. As shown more clearly in FIG. 19 of the drawings, the blast-valve lever 141 is pivotally mounted by a pivot pin 142, the latter being journaled within support brackets 143 (FIG. 19) suitably provided by stationary bracket portions depending the cover portion 2a of the tank 2.

The manner of blast-valve operation of the modified-type of blast-valve latch assembly 132, illustrated in FIGS. 16–19, is similar to that previously described in connection with FIGS. 5 and 6 of the drawings. Leftward opening movement of the pull rod 21 effects, through the bell-crank lever assembly 131, downward opening movement of the insulating lift rod 19. In addition, the counterclockwise rotative movement of the bell-crank lever assembly 131, as viewed in FIG. 16, causes ratching interengagement between the ratchet teeth 63a and the nose 133a of the pawl 133 to effect counterclockwise rotative movement of the blast-valve operating lever assembly 141 about the stationary pivot pin 142 as a center. Upward opening movement of the blast-valve stem 59 occurs with consequent blast-valve opening, as illustrated in FIG. 17.

Generally downward opening movement of the pawl 133, as viewed in FIG. 17, effects, through a captive connecting bolt 145, clockwise rotative movement of the blast-valve lever 132. This movement continues until the limit portion 135 engages the stop pin 136. This sudden halting of the stop portion 135 insures, by way of the flexible connection 146, disengagement of the nose 133a of pawl 133 from the particular ratchet tooth 63a then being engaged. The bell-crank lever 131 continues its counterclockwise rotative movement with corresponding continued downward opening movement of the lift rod 19 to effect the two isolating breaks into the circuit. The blast valve 57, however, is free to close depending upon the pressure conditions existing within the region 77 (FIG. 6) previously described.

With regard to the ratchet surfaces 63 of bell-crank arms 60b, 131a, it will be observed that when the breaker is attempted to be closed during the existence of a fault condition on the line, and the relays initiate an opening operation of the mechanism prior to a full closure thereof, the pawl nose 64a, 133a may engage on a number of different ratchet teeth 63a depending upon the extent of closing travel of the operating mechanism. Thus, no matter which ratchet tooth 63a is engaged by the pawl nose, nevertheless the blast valve 57 will be opened in the previously described manner. The determination of which ratchet tooth 63a is engaged upon the ratchet surface 63 is dependent upon the extent of closing travel of the lift rod 19 during such a closing operation while fault conditions exist upon the line.

From the foregoing description of several embodiments of the invention, it will be apparent that there is provided an improved compressed-gas circuit interrupter of the dual-pressure type involving an improved arc-extinguishing unit construction, together with a conjointly-acting blast-valve operating linkage 43. The mechanism is such as to effect opening of the blast valve 57 at the desired time and to retain it open until the arc is fully extinguished without wasting high-pressure gas. The several tank structures 2 illustrated in FIGS. 1, 9 and 11 of the drawings indicate the flexibility of the arc-extinguishing unit construction and the universal application thereof to various current and voltage ratings. In addition, it will be noted that the arc-extinguishing unit may be employed either with a shunting impedance means 51, as illustrated in FIG. 4 of the drawings, or may be used without such a shunting impedance means 51, as illustrated in FIG. 13 of the drawings.

The present invention is particularly adaptable for a single-tank double-pressure design in which the basic interrupting principles utilize a closed double-pressure system to discharge gas from the high-pressure side, for example, 220 p.s.i.g. to a low-pressure side, for example, 40 p.s.i.g. for the desired gas flow. Preferably, a compressor, not shown, provided in the gas control compartment 25 is effective to take gas from the low-pressure side and pump it back into the high-pressure side for subsequent reuse. The M.V.A. rating of the present interrupter may vary from 5000 M.V.A. to say, for example, 10,000 M.V.A. In the particular interrupter construction illustrated in FIGS. 1 and 2 of the drawings, the load current rating may, for example, be 2,000 amperes with an interrupting time of five cycles.

By having a dead-tank construction, that is by having the tank 2, 99, 103 grounded, maximum safety is provided for operating personnel, and the live ends of the terminal bushings are at an adequate distance above ground potential away from the reach of workmen. In addition, it will be noted that the blast-valve operating linkage 20, 130 is at ground potential, with only insulating blast tubes 36 interconnecting the grounded portions of the interrupter with the high-voltage elements associated with the interrupting units 7, 105.

The improved terminal-bushing construction of the present invention provides an economical and axially compact terminal bushing arrangement in which by reducing the axial length of the ground flange and surrounding the upper porcelain shell by the current transformers to thereby reduce the length of the bushing.

Certain features of the gas-filled terminal bushing construction are set forth and claimed in United States patent application filed December 2, 1959, Serial No. 856,775, now United States Patent 3,059,044, issued October 16, 1962 to Robert E. Friedrich and James H. Frakes, and assigned to the assignee of the instant application.

Although there have been illustrated and described specific interrupting structures, it is to be clearly understood that the same were merely for the purposes of illustration, and that changes and modifications may readily be made therein by those skilled in the art, without departing from the spirit and scope of the invention.

We claim as our invention:

1. A circulating-type compressed-gas circuit interrupter including a single grounded metallic exhaust tank, three pairs of terminal bushings extending into said single exhaust tank, three pole-units associated with the interior ends of the three pairs of terminal bushings, each pole-unit including a pair of serially-related compressed-gas arc-extinguishing units and a movable conducting bridging member, a pair of movable tubular venting contacts secured adjacent the ends of each bridging member, each arc-extinguishing unit being of the orifice type and secured to the inner end of the respective terminal bushing, a source of high-pressure gas at ground potential, conduit means including three pairs of elongated insulating blast tubes for supplying blasts of high-pressure gas from said high-pressure source to each of the three pole-units, a single blast valve at ground potential disposed adjacent the upper end of said metallic exhaust tank for simultaneously controlling the blasting of gas through each of said pairs of blast tubes, a vertical lift rod for each bridging member, means for simultaneously actuating the three lift rods in a vertical direction including a reciprocally-movable horizontally-extending operating rod and linkage interposed between said horizontally-extending operating rod and the three lift rods for converting horizontal operating movement to vertical contact movement of the lift rods, a releasable blast-valve operating means for each of the three blast valves disposed at the upper end of the tank and simultaneously actuated by said actuating means, whereby a timed flow of high-pressure gas flows through the six blast tubes and through the respective orifices of the respective units and at least partially through the movable venting contact to exhaust into the general interior of the exhaust tank.

2. The circuit interrupter according to claim 1, wherein each arc-extinguishing unit has a stationary contact cooperable with the respective movable contact, a contact tap 55 is disposed adjacent the respective orifice opening, and a shunting impedance is electrically connected between the respective stationary contact and the respective contact tap to facilitate interruption of the arc.

3. A circulating-type compressed-gas circuit interrupter including a single grounded metallic exhaust tank, three pairs of terminal bushings extending into said single exhaust tank, three pole-units associated with the interior ends of the three pairs of terminal bushings, each pole-unit including a pair of serially-related compressed-gas arc-extinguishing units and a movable conducting bridging member, a pair of movable tubular venting contacts disposed adjacent the ends of each bridging member and actuated thereby, each arc-extinguishing unit being of the orifice type and secured to the inner end of the respective terminal bushing, a source of high-pressure gas at ground potential, conduit means including three pairs of elongated insulating blast tubes for supplying blasts of high-pressure gas from said high-pressure source to each of the three pole-units, a single blast valve at ground potential disposed adjacent the upper end of said metallic exhaust tank for simultaneously controlling the blasting of gas through each of said pairs of blast tubes, a vertical lift rod for each bridging member, means for simultaneously actuating the three lift rods in a vertical direction including a reciprocally-movable horizontally-extending operating rod and linkage interposed between said horizontally-extending operating rod and the three lift rods for converting horizontal operating movement to vertical contact movement of the lift rods, a releasable blast-valve operating means for each of the three blast valves disposed at the upper end of the tank and simultaneously actuated by said actuating means, whereby a timed flow of high-pressure gas flows through the six blast tubes and through the respective orifices of the respective units and at least partially through the movable venting contact to exhaust into the general interior of the exhaust tank.

4. The circuit interrupter of claim 3, wherein the movable tubular contacts of each arc-extinguishing unit make separable abutting engagement with the respective movable conducting bridging member.

5. The circuit interrupter of claim 1, wherein said source of high-pressure gas comprises a grounded high-pressure reservoir tank 29 extending over the metallic exhaust tank between the three pairs of terminal bushings.

6. The circuit interrupter of claim 1, wherein each arc-extinguishing unit has a stationary contact structure comprising circumferentially-disposed contact fingers bearing externally of the respective movable tubular contact and a downwardly-extending arc horn is provided which protrudes within the respective movable tubular contact.

7. A compressed-gas circuit interrupter including a source of high-pressure gas, a blast valve having a valve stem for controlling a flow of high-pressure gas from said source, separable arcing contacts and operating means for said separable arcing contacts including an operating member, the combination therewith of rotatable ratchet means mechanically connected to said operating member and having a first camming portion, a rotatable latch assembly 65 comprising a blast-valve operating lever pivotally connected to a ratchet pawl 64 having a free outer second camming portion 94, a portion of said blast-valve operating lever engaging said valve stem to effect opening movement thereof during the opening operation of the interrupter, spring means for biasing said rotatable latch assembly into ratcheting engagement with said rotatable ratchet means during the opening operation of the interrupter, and the first and second camming portions interengaging at a predetermined time during the opening operation to thereby cam the ratchet pawl 64 out of ratcheting engagement with the rotatable ratchet means to thereby effect blast-valve closure.

8. The compressed-gas circuit interrupter of claim 7, wherein the blast valve moves within a valve cylinder 74, has apertures 75 provided therein, and biasing means are provided to close the blast valve, whereby valve closure is dependent upon the pressure conditions within said valve cylinder behind the blast valve.

9. The compressed-gas circuit interrupter of claim 3, wherein each releasable blast-valve operating means includes a ratchet means movable in response to movement of the respective movable contacts for a respective pole-unit, a ratchet pawl for opening the respective blast valve, and means for releasing at a desired time the ratcheting engagement between the respective ratchet means and the respective ratchet pawl.

10. The circuit interrupter of claim 4, wherein each arc-extinguishing unit has a stationary contact cooperable with the respective movable contact, and a shunting impedance is electrically connected between the respective stationary contact and its associated movable contact.

References Cited by the Examiner
UNITED STATES PATENTS

| | | | |
|---|---|---|---|
| 1,775,529 | 9/1930 | Jansson | 174—139 |
| 1,868,606 | 7/1932 | Jansson | 174—139 |
| 1,873,977 | 8/1932 | Naef | 174—18 |
| 2,294,824 | 9/1942 | Baker et al. | 200—148 |
| 2,414,522 | 1/1947 | Hall | 200—148.6 |
| 2,459,599 | 1/1949 | Strom | 200—148.2 |
| 2,507,210 | 5/1950 | Ludwig et al. | 200—148.2 |
| 2,664,457 | 12/1953 | Joublanc | 174—140 |
| 2,760,033 | 8/1956 | MacNeill et al. | 200—150 |
| 2,762,890 | 9/1956 | Taylor et al. | 200—150 |
| 2,459,599 | 1/1949 | Strom | 200—148.2 |
| 3,033,962 | 5/1962 | Friedrich et al. | 200—145 |
| 3,164,704 | 1/1965 | Yeckley et al. | 200—148 |

ROBERT K. SCHAEFER, *Primary Examiner.*

BERNARD A. GILHEANY, *Examiner.*

R. M. SKOLNIK, *Assistant Examiner.*